(12) United States Patent
Chou

(10) Patent No.: US 7,528,885 B2
(45) Date of Patent: May 5, 2009

(54) PORTABLE ELECTRONIC DEVICE WITH LENS ROTATION POSITIONING STRUCTURE

(75) Inventor: Cheng-Hao Chou, Taipei (TW)

(73) Assignee: Ensky Technology Co., Ltd., Pan Chiao, Taipei Hsien (TW)

( * ) Notice: Subject to any disclaimer, the term of this patent is extended or adjusted under 35 U.S.C. 154(b) by 812 days.

(21) Appl. No.: 11/050,844

(22) Filed: Feb. 7, 2005

(65) Prior Publication Data

US 2006/0176390 A1     Aug. 10, 2006

(51) Int. Cl.
*H04N 5/225* (2006.01)

(52) U.S. Cl. .................. 348/373; 348/333.01; 348/335; 348/14.02

(58) Field of Classification Search ......... 348/373–375, 348/14.01, 333.01, 14.02, 335; 455/90.3, 455/556.1
See application file for complete search history.

(56) References Cited

U.S. PATENT DOCUMENTS

| | | | | |
|---|---|---|---|---|
| 5,374,971 | A * | 12/1994 | Clapp et al. | 348/376 |
| 6,697,117 | B1 * | 2/2004 | Park | 348/373 |
| 7,133,691 | B2 * | 11/2006 | Kang | 348/14.01 |
| 7,345,833 | B2 * | 3/2008 | Hwang | 455/556.1 |
| 2004/0012701 | A1 * | 1/2004 | Nagai et al. | 348/333.12 |
| 2004/0203535 | A1 * | 10/2004 | Kim et al. | 455/90.3 |
| 2005/0094025 | A1 * | 5/2005 | Yoon | 348/360 |
| 2005/0275725 | A1 * | 12/2005 | Olsson et al. | 348/207.99 |

* cited by examiner

*Primary Examiner*—Lin Ye
*Assistant Examiner*—Gevell Selby
(74) *Attorney, Agent, or Firm*—Winston Hsu

(57) ABSTRACT

A portable electronic device with lens rotation positioning structure comprising an outer casing, a lens main body, a knob, a liquid crystal display and a positioning assembly is disclosed. The lens main body is configured with lens and electronic element required for operation; the liquid crystal display is electrically connected with the electronic element disposed inside the lens main body. Images obtained by the lens main body through the lens are displayed on the liquid crystal display. A first pivot and a second pivot are respectively disposed externally on each side of lens main body with the first pivot securely linked to the knob. The outer casing further consists of an upper casing and a lower casing, which respectively is arranged with a space that can accommodate lens main body, knob and positioning assembly. In addition, a first axle seat and a second axle seat are respectively arranged on the upper casing and the lower casing opposite to the first pivot and the second pivot disposed on each side of lens main body. The positioning assembly is arranged between the knob and the first axle seat so that the knob connected to the lens main body can be securely engaged when it is rotated to a predetermined angle.

8 Claims, 5 Drawing Sheets

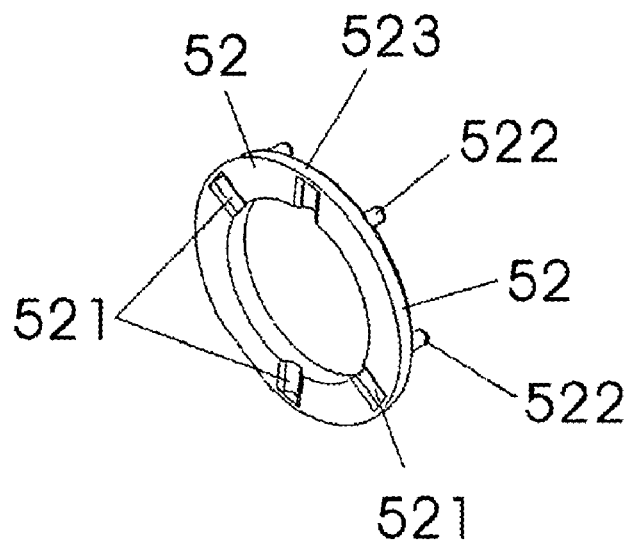
F I G.5
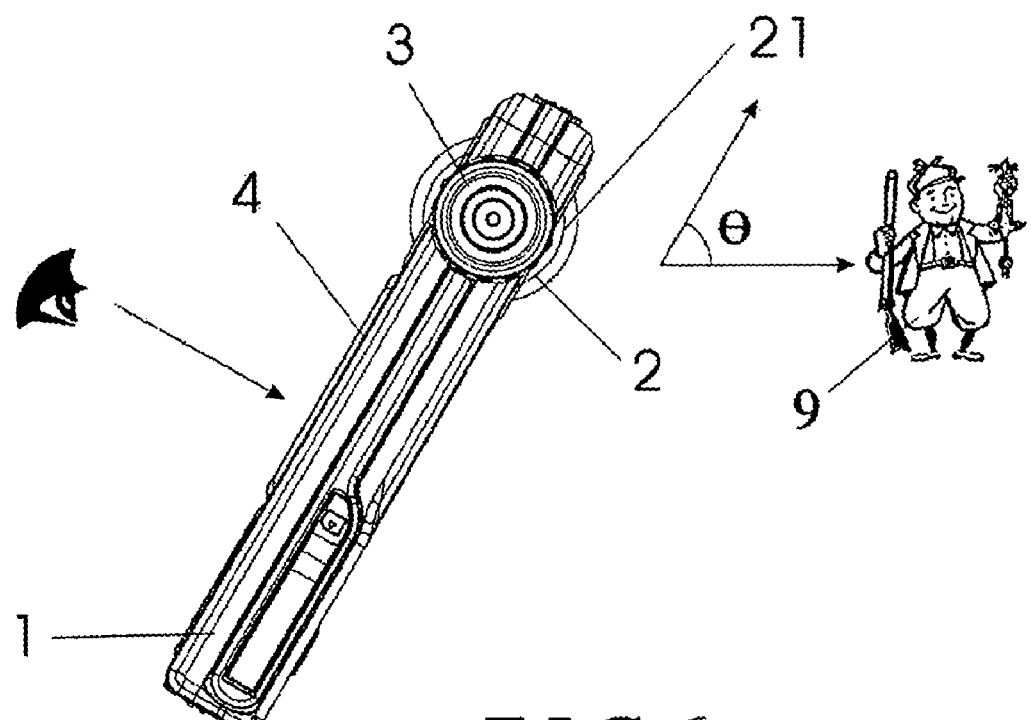
F I G.6

PORTABLE ELECTRONIC DEVICE WITH LENS ROTATION POSITIONING STRUCTURE

BACKGROUND OF INVENTION

1. Field of the Invention

The present invention relates to a portable electronic device with lens rotation positioning structure, in particular a kind of positioning assembly with excellent wear resistance disposed between the rotatable lens or knob and outer casing so that the lens may be rotated to be concealed or secured at specific angle to facilitate the user of the electronic device in actual operation.

2. Description of the Prior Art

Along with technological progress and development, many innovative technologies have been applied to products used in daily lives to bring convenience to people. Computer technology most of all has evolved rapidly in many directions. Aside from enhanced performance, the applications of computer have expanded from simple computer system to all kinds of products, including consumer electronic products. As digital technology replaces the conventional analog technology, consumer electronic products become smaller, lighter and easy to carry (e.g. digital voice recorder replaces tape recorder, digital camera and digital video replace the conventional camera and video camera that use films and tapes). Similarly, the digital data obtained are easy to store, edit and transmit. Taking advantage of the digital technology, many manufacturers develop multi-functional consumer electronic products (e.g. MP3 player that works as a radio, walkman and data storage, and PDA with the functions of handset, digital camera and voice recorder). For picture taking and filming, many mobile phone, voice recorder and PDA, in addition to digital camera and digital video, now come with lens and offer the function of shooting pictures or video recording. Products having either a fixed lens or zoom lens currently available on the market typically have a lens A directly mounted at the front of product and a LCD B at the back (FIG. 1A and FIG. 1B). Such arrangement makes it necessary to provide additionally a protective cover which is easy to be misplaced or an elaborately designed shutter mechanism C to effectively keep lens A from dust or the harm of undue force. On the other hand, in light that the viewfinding angle of lens A is identical to user's angle of viewing the LCD (FIG. 2A), it is difficult for user to see clearly the display on LCD when he tries to take some pictures of special angles. This not only creates inconvenience for the user, it might cause physical discomfort if the user constantly operates the electronic device in stiff and non-ergonomic posture.

SUMMARY OF INVENTION

The primary object of the present invention is to provide a portable electronic device with lens rotation positioning structure that allows the rotatable lens to be secured at certain predetermined angles with a positioning assembly to facilitate operation by the user.

Another object of the present invention is to provide a portable electronic device with lens rotation positioning structure, wherein the lens configured in the lens main body may be concealed by the outer casing when not in use and protected as it is secured by the positioning assembly.

Yet another object of the present invention is to provide a portable electronic device with lens rotation positioning structure, wherein the angle intersecting the extension line formed by the lens configured in lens main body and the object of shooting and the extension line from the surface of LCD θ is less than 90 degrees.

A further object of the present invention is to provide a portable electronic device with lens rotation positioning structure, wherein said positioning assembly further consists of a fixed unit and a movable unit; the fixed unit is made of Teflon material that allows smoother contact with the movable unit and possesses good wear resistance so as to enhance the service life of the positioning assembly.

To achieve the aforesaid objects, the present invention comprises primarily an outer casing, a lens main body, a knob, a liquid crystal display (LCD), and an electronic element. The lens main body is configured with lens and electronic element required for operation; the liquid crystal display is electrically connected with the electronic element disposed inside the lens main body. Images obtained by the lens main body through the lens are displayed on the liquid crystal display. A first pivot and a second pivot are respectively disposed on each side of lens main body; the first pivot is securely linked to the knob. The outer casing further consists of an upper casing and a lower casing, which respectively is arranged with a space that can accommodate lens main body, knob and positioning assembly. In addition, a first axle seat and a second axle seat are respectively arranged on the upper casing and the lower casing opposite to the first pivot and the second pivot disposed on each side of lens main body. The positioning assembly is arranged between the knob and the first axle seat consisting of a fixed unit and a movable unit, where the fixed unit is securely arranged on the side of first axle seat opposite the knob, while the movable unit is securely arranged on the side of knob opposite the first axle seat. At least either the fixed unit or the movable unit is made of Teflon material.

BRIEF DESCRIPTION OF THE DRAWINGS

FIG. 5 is a schematic drawing of fixed unit having Teflon surface according to the present invention.

FIG. 6 is a plane sketch of the present invention during shooting.

DETAILED DESCRIPTION

Figure 1B:
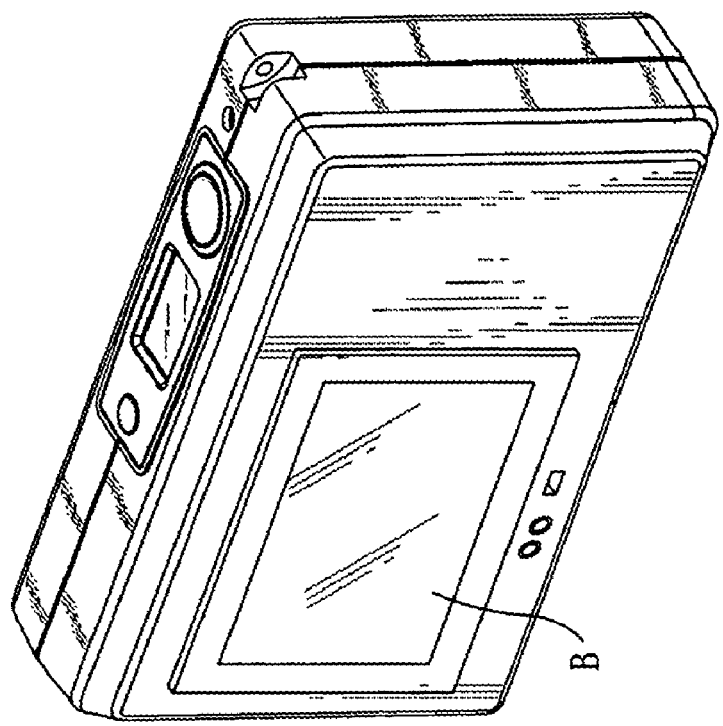
FIG. 1B is a perspective view of prior art from another angle.
Figure 1A:
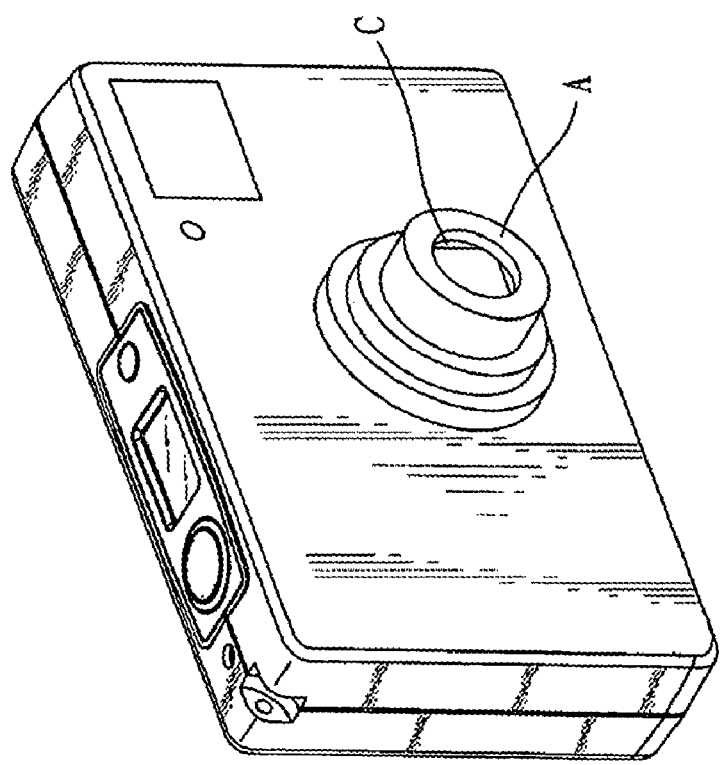
FIG. 1A is a perspective view of prior art.
Figure 2:
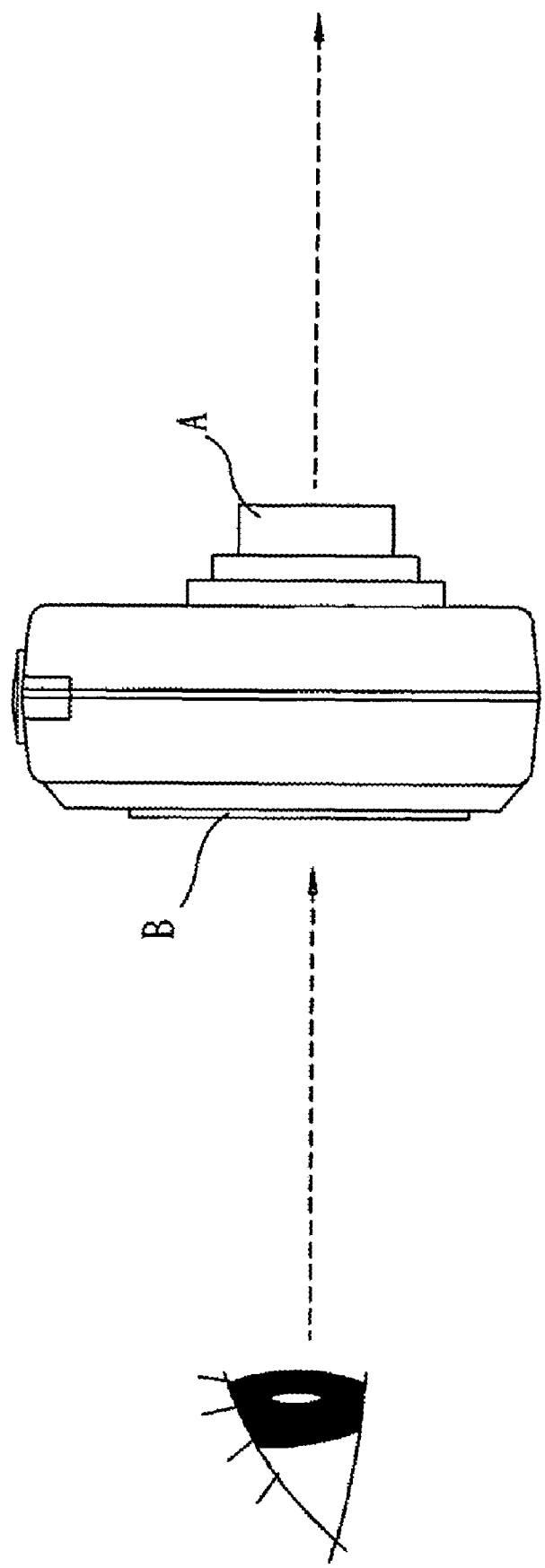
FIG. 2 is a plane sketch of prior art in operation.
Figure 3:
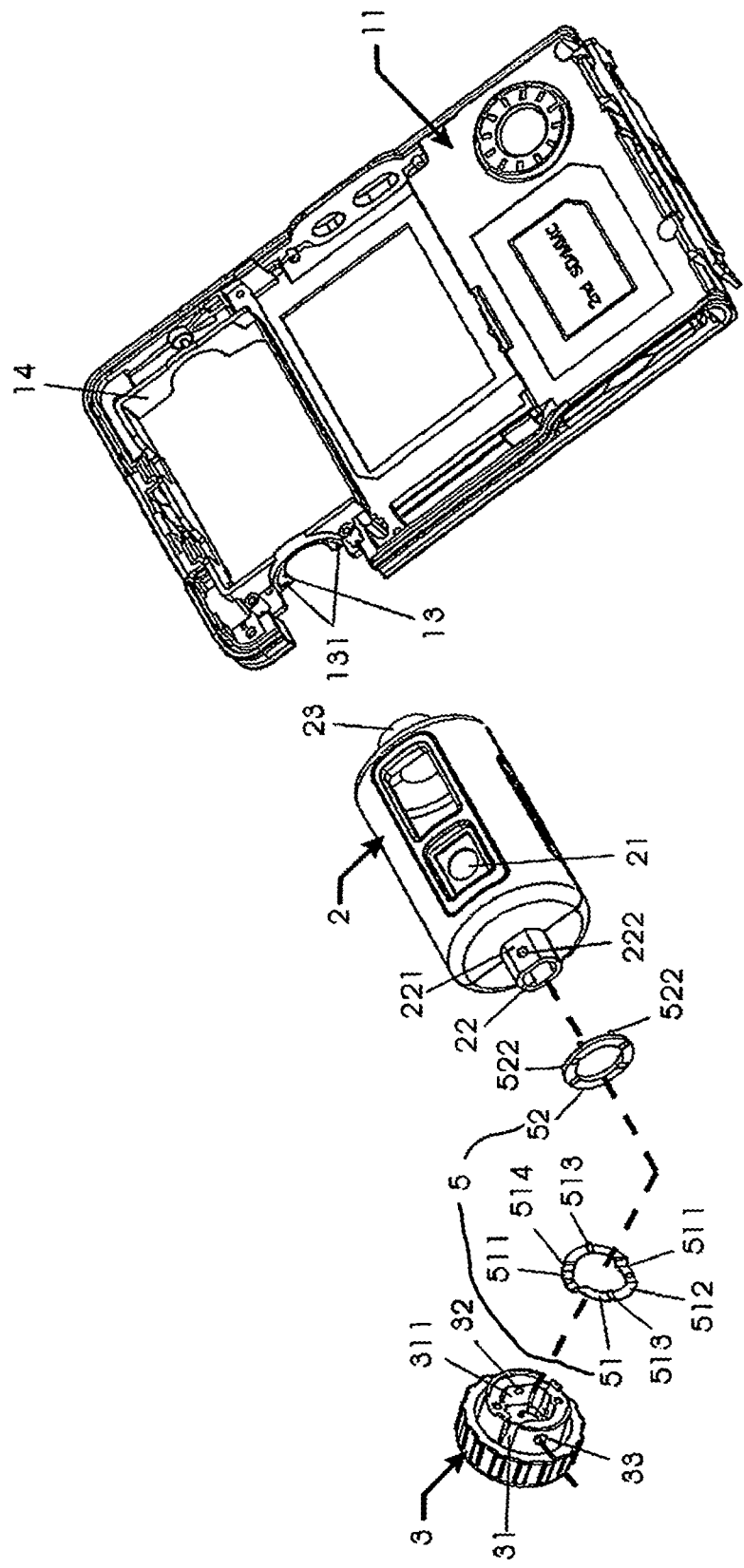
FIG. 3 is a three-dimensional exploded view of the present invention.
Figure 4:
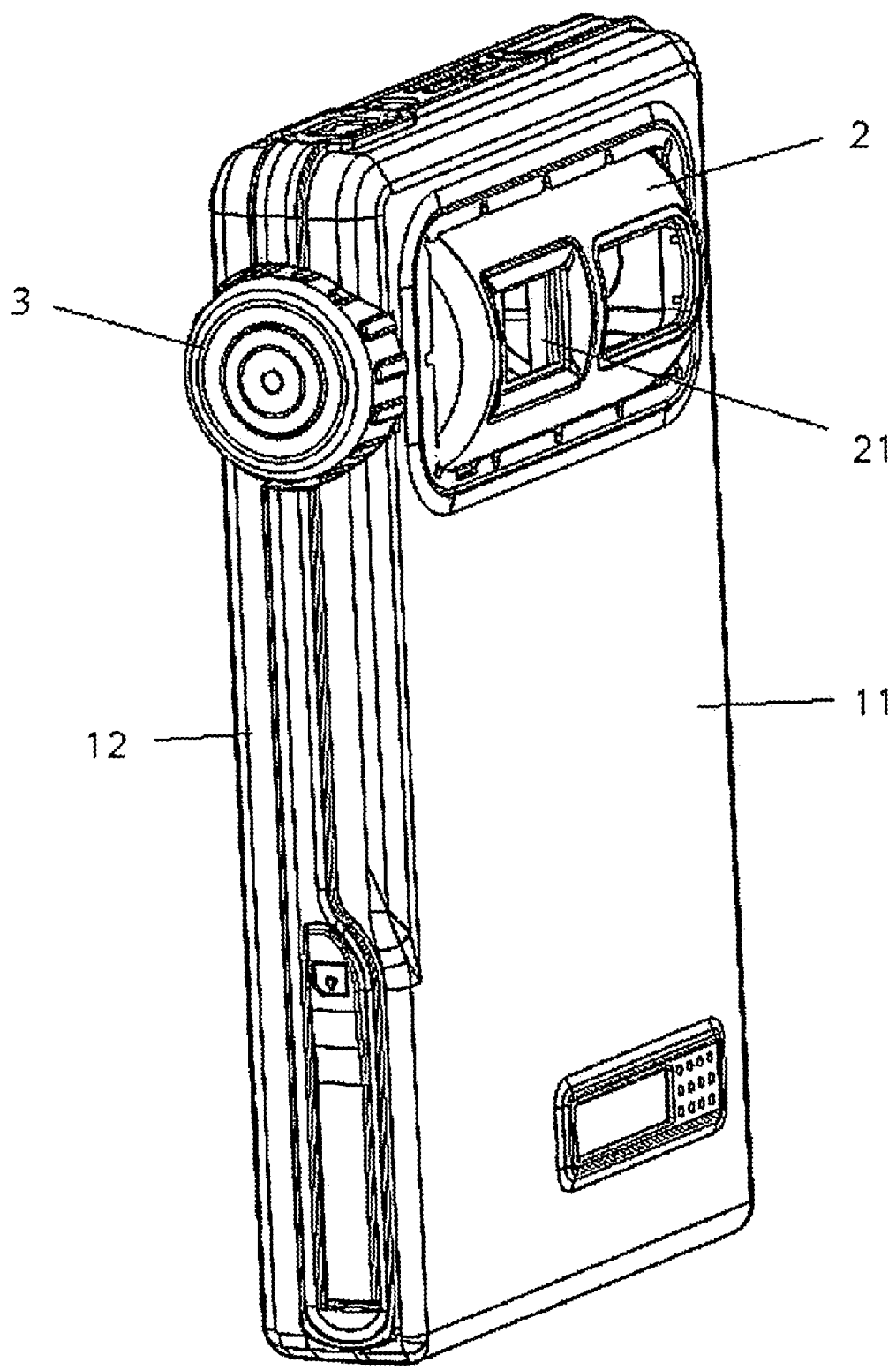
FIG. 4 is a three-dimensional assembly view of the present invention.

Referring to FIG. 3 and FIG. 4 which show respectively the three-dimensional exploded view and three-dimensional assembly view of the invention, the portable electronic device with lens rotation positioning structure according to the present invention mainly comprises: an outer casing 1, a lens main body 2, a knob 3, a liquid crystal display (LCD) 4, and a positioning assembly 5, wherein the lens main body 2 contains lens 21 and electronic element (not shown here) required for the operation, and the LCD 4 is mounted on outer casing 1 and electrically connected to the electronic element inside the lens main body 2 to display images obtained by the lens main body through lens 21. A first pivot 22 and a second pivot 23 are respectively arranged externally on each side of lens main body 2, wherein the first pivot 22 is securely linked to knob 3. The outer casing 1 further consists of an upper casing 11 and lower casing 12, which respectively is arranged with a space that can accommodate lens main body 2, knob 3 and positioning assembly 5. In addition a first axle seat 13 and a second axle seat 14 are respectively arranged on the upper casing 11 and the lower casing 12 opposite the first pivot 22 and the second pivot 23 disposed on each side of lens main body 2. The positioning assembly 5 is configured between knob 3 and first axle seat 13 so that the knob 3 connected to the lens main body 2 can be securely engaged when it is rotated to a predetermined angle.

The positioning assembly 5 consists of a movable unit 51 and a fixed unit 52, wherein the movable unit 51 forms an immobile member 511 and at least one elastic member 512 by bending. The immobile member 511 is secured to the side of knob 3 opposite the first axle seat 13, while the elastic member 512 on the movable unit 51 is configured with at least one protruding member 513 on the side in contact with fixed unit 52. In addition, the fixed unit 52 is securely disposed on the side of first axle seat 13 opposite the knob 3 and arranged with a plurality of indents 521 to engage and position the protruding member 513 disposed on movable unit 51. As such, when user turns the knob 3, lens main body 2 is also turned, which simultaneously drives the turning of movable unit 51 securely disposed on one side of knob 3 such that the protruding member 513 disposed on the elastic member 512 will be in contact with one side of fixed unit 52 until it engages the indent 521 disposed on fixed member 52 and becomes securely positioned. By advance planning of the position of indents 521, the positioning angles of lens main body 2 may be predetermined.

In the construction described above, the positioning structure configured between first pivot 22 and knob 3 has at least one cut plane 221 on the arc surface of cylindrical-shaped first axle 22 and has a socket 31 on knob 3 that corresponds to first pivot 22 and similarly has a cut plane 311, such that after first pivot 22 is inserted into the socket 31 configured on knob 3, linkage movement occurs when cut planes 221 and 311 contact and counteract each other. To prevent separation of first pivot 22 from socket 31 configured on knob 3, a fixating hole 222 is disposed on the cut plane 221 of first pivot 22 and a through-hole 32 is disposed on knob 3 at a location opposite the fixating hole 22 that allows the passing of a screw 6 to lock first pivot 22 and knob 3.

In the construction described above, the positioning structure between fixed unit 52 and first axle seat 13 has a plurality of convex rods 522 on the side of fixed unit 52 opposite first axle seat 13 and a plurality of fixating holes 131 at the position of first axle seat 13 relative to convex rods 522 for the insertion of convex rods 522, so that the fixed unit 52 may be secured to prevent misplacement between fixed unit 52 and first axle seat 13. In addition, the movable unit 51 is disposed with a through-hole 514 on its immobile member 511 and in correspondence, a fixating hole 33 is disposed on knob 3 so that the movable unit 51 may be secured to one side of knob 3 by passing a screw 7 through the through-hole 514 on movable unit 51 and screw-positioning it in fixating hole 33.

In the aforesaid structure, a Teflon layer 523 (FIG. 5) with excellent wear resistance is disposed on the side of fixed unit 52 of positioning assembly 5 in contact with the movable unit 51 so that protruding member 513 on movable unit 51 is in smooth contact with fixed unit 52, thereby greatly enhancing its service life. That is, because the contact surface between the fixed unit 52 and the movable unit 51 is formed with the Teflon layer 523 which has great wear resistance, therefore the service life will be greatly enhanced. Besides disposing a Teflon layer 523 on fixed unit 52, the fixed unit 52 may be made directly of Teflon material.

Through the design of positioning assembly 5, the rotatable lens main body 2 of the present invention may be engaged and positioned at a few predetermined angles at the discretion of the user without displacement under the exertion of external force. As such, lens 21 in lens main body 2 may be concealed in outer casing 1 when not in use without the need of a complicated cap structure to protect it. Also through the design of positioning assembly 5, the angle θ intersecting the extension line formed by the lens 21 configured in lens main body 2 and the object of shooting and the extension line from the surface of LCD is less than 90 degrees. Referring to FIG. 6 which shows the plane sketch of the present invention during shooting, because of the design of positioning assembly 5, user can tilt the LCD 4 of the portable electronic device slightly in front of him. As such, the eyes 8 of the user can view the images on LCD 4 without any strain. At the same time, lens 21 in lens main body 2 can shoot or record the object of shooting 9 in front. The intersection angle θ produced by the extension line formed by lens 21 of lens main body 2 and the object of shooting 9 and the extension line from the surface of LCD 4 preferably ranges between 20 degrees and 70 degrees.

As described above, the design of positioning assembly offers the users of portable electronic device more flexibility in filming or shooting and carry out the task in a more relaxed manner. In addition, the use of wear-resistant Teflon for the contact surface of positioning assembly renders the motions of positioning assembly smoother, thereby prolonging its service life.

Preferred embodiments of the present invention have been disclosed. All modifications and alterations without departing from the spirits of the invention shall remain within the protected scope and claims of the invention.

What is claimed is:

1. A portable electronic device with lens rotation positioning structure, comprising:

a lens main body configured internally with lens and electronic element required for operation and a first pivot and a second pivot disposed externally on each side thereof;

an outer casing consisting of an upper casing and a lower casing which is respectively disposed with a space thereon that can accommodate lens main body, knob and the positioning assembly; a first axle seat and a second axle seat are respectively disposed on upper casing and lower casing in a position relative to the first pivot and the second pivot arranged at each side of lens main body;

a knob linking securely to the first pivot disposed at one side of lens main body;

a liquid crystal display (LCD) mounted on the outer casing and electrically connected to the electronic element disposed inside the lens main body for displaying images obtained by lens in lens main body; and a positioning assembly configured between the knob and the first axle seat and consisting of a movable unit and a fixed unit, wherein said movable unit forms by bending an immobile member and at least an elastic member; said immobile member is secured to the side of knob opposite the first axle seat; the side of said elastic member in contact with the immobile member is configured with at least one protruding member; and the fixed unit is secured to the side of first axle seat opposite the knob and arranged with a plurality of indents to engage and position the protruding member disposed on movable unit, the side of said fixed unit in contact with the at least one protruding member is arranged with a wear resistance layer; wherein the positioning structure configured on the side of lens main body between the first pivot and the knob mainly has at least one cut plane on the arc surface of the cylindrical-shaped first pivot, and in correspondence, a socket on the knob that similarly has a cut plane for insertion of first pivot.

2. The portable electronic device with lens rotation positioning structure of claim 1, wherein the cut plane on the first pivot is disposed with a fixating hole, and in correspondence, a through-hole is disposed on the knob at the position opposite the fixating hole that allows a screw to pass through and lock the first pivot and the knob.

3. The portable electronic device with lens rotation positioning structure of claim 1, wherein the positioning structure between the fixed unit and the first axle seat mainly has a plurality of convex rods on the side of fixed unit opposite first axle seat, and in correspondence, a plurality of fixating holes at the position of first axle seat relative to convex rods for the insertion of convex rods, so that the fixed unit may be secured by inserting the convex rods disposed thereon into the fixating holes on first axle seat.

4. The portable electronic device with lens rotation positioning structure of claim 1, wherein the movable unit of positioning assembly mainly has a through-hole on its immobile member, and in correspondence, a fixating hole is disposed at a relative position on the knob that allows a screw to pass through and lock the movable unit and the knob.

5. A portable electronic device with lens rotation positioning structure, comprising:
- a lens main body configured internally with lens and electronic element required for operation and a first pivot and a second pivot disposed externally on each side thereof;
- an outer casing consisting of an upper casing and a lower casing which is respectively disposed with a space thereon that can accommodate lens main body, knob and the positioning assembly; a first axle seat and a second axle seat are respectively disposed on upper casing and lower casing in a position relative to the first pivot and the second pivot arranged at each side of lens main body;
- a knob linking securely to the first pivot disposed at one side of lens main body;
- a liquid crystal display (LCD) mounted on the outer casing and electrically connected to the electronic element disposed inside the lens main body for displaying images obtained by lens in lens main body; and
- a positioning assembly configured between the knob and the first axle seat and consisting of a movable unit and a fixed unit made, wherein said movable unit forms by bending an immobile member and at least an elastic member; said immobile member is secured to the side of knob opposite the first axle seat; the side of said elastic member in contact with the immobile member is configured with at least one protruding member; and the fixed unit, which is made of wear resistance material, is secured to the side of first axle seat opposite the knob and arranged with a plurality of indents to engage and position the protruding member disposed on movable unit;
- wherein the positioning structure configured on the side of lens main body between the first pivot and the knob mainly has at least one cut plane on the arc surface of the cylindrical-shaped first pivot, and in correspondence, a socket on the knob that similarly has a cut plane for insertion of first pivot.

6. The portable electronic device with lens rotation positioning structure of claim 5, wherein the cut plane on the first pivot is disposed with a fixating hole, and in correspondence, a through-hole is disposed on the knob at the position opposite the fixating hole that allows a screw to pass through and lock the first pivot and the knob.

7. The portable electronic device with lens rotation positioning structure of claim 5, wherein the positioning structure between the fixed unit and the first axle seat mainly has a plurality of convex rods on the side of fixed unit opposite first axle seat, and in correspondence, a plurality of fixating holes at the position of first axle seat relative to convex rods for the insertion of convex rods, so that the fixed unit may be secured by inserting the convex rods disposed thereon into the fixating holes on first axle seat.

8. The portable electronic device with lens rotation positioning structure of claim 5, wherein the movable unit of positioning assembly mainly has a through-hole on its immobile member, and in correspondence, a fixating hole is disposed at a relative position on the knob that allows a screw to pass through and lock the movable unit and the knob.

* * * * *